(12) United States Patent
Lin et al.

(10) Patent No.: US 12,371,288 B2
(45) Date of Patent: Jul. 29, 2025

(54) AUTOMATIC DOCUMENT FEEDER

(71) Applicant: Foxlink Image Technology Co., Ltd., New Taipei (TW)

(72) Inventors: Ming Wei Lin, New Taipei (TW); Wen Ching Liao, New Taipei (TW); Wei Pin Hsieh, New Taipei (TW)

(73) Assignee: Foxlink Image Technology Co., Ltd., New Taipei (TW)

( * ) Notice: Subject to any disclaimer, the term of this patent is extended or adjusted under 35 U.S.C. 154(b) by 237 days.

(21) Appl. No.: 18/200,637

(22) Filed: May 23, 2023

(65) Prior Publication Data
US 2024/0036455 A1    Feb. 1, 2024

(30) Foreign Application Priority Data

Jul. 26, 2022    (CN) .......................... 202221948544.7

(51) Int. Cl.
*B65H 5/36*    (2006.01)

(52) U.S. Cl.
CPC ......... *B65H 5/36* (2013.01); *B65H 2403/942* (2013.01); *B65H 2404/632* (2013.01); *B65H 2801/39* (2013.01)

(58) Field of Classification Search
CPC ................ B65H 5/36; B65H 2404/632; B65H 2404/633; B65H 2404/693; B65H 2801/39; B65H 2403/942; B65H 29/58; B65H 29/60
See application file for complete search history.

(56) References Cited

FOREIGN PATENT DOCUMENTS

JP         60026560 A   *   2/1985   ............. B65H 29/58

* cited by examiner

*Primary Examiner* — Jeremy R Severson

(57) ABSTRACT

An automatic document feeder includes a horizontal feeding path, a curve feeding path, a scanning unit arranged in the horizontal feeding path, a motor, a movable document guider, an actuator, a feeding roller arranged in the horizontal feeding path, and a transmission structure. One end of the curve feeding path is connected with a common document inlet, the other end of the curve feeding path is connected with a middle of the horizontal feeding path. A gentle bending corner is formed at a junction area between the curve feeding path and the horizontal feeding path. The motor outputs a forward torque or a converse torque. The movable document guider is rotatably positioned near the gentle bending corner. The actuator is rotatably positioned near the gentle bending corner. The transmission structure is connected among the motor, the feeding roller and the actuator.

8 Claims, 8 Drawing Sheets

AUTOMATIC DOCUMENT FEEDER

CROSS-REFERENCE TO RELATED APPLICATION

The present application is based on, and claims priority from, China Patent Application No. 202221948544.7, filed Jul. 26, 2022, the disclosure of which is hereby incorporated by reference herein in its entirety.

BACKGROUND OF THE INVENTION

1. Field of the Invention

The present invention generally relates to an automatic document feeder, and more particularly to an automatic document feeder which has a function of feeding documents continuously and a function of feeding thick documents automatically.

2. The Related Art

A common scanner includes a scanning platform for placing documents, and a scanning unit for capturing document images. When a user wants to scan the document, the document is placed on the scanning platform for scanning. After the document is completely scanned, the document is manually removed from the scanning platform. The user takes quite a lot of time to remove the document manually, so many scanners are equipped with automatic document feeders to improve an efficiency of processing the documents.

Referring to FIG. 8, a C-shape ADF (Automatic Document Feeder) is arranged for feeding massive documents into the scanner continuously and automatically. The C-shape ADF includes an input tray 70, a document feeding path 71 connected with the input tray 70, a pickup roller 72 arranged at a junction area between the input tray 70 and the document feeding path 71, a plurality of transmission rollers 73 arranged in the document feeding path 71, a scanning unit 74 arranged in the document feeding path 71, and an output tray 75 connected to a tail end of the document feeding path 71. The document feeding path 71 is formed in a C-shape.

The C-shape ADF sequentially feeds the documents stacked in the input tray 70 into the document feeding path 71 by the pickup roller 72, and the input tray 70 is positioned over the scanning unit 74 and the output tray 75 through the document feeding path 71, so a length of the scanner is reduced.

However, when the thick documents, such as cards or bound books are scanned, the thick documents are hard to be bent, so the thick documents are unable to be fed through the document feeding path 71 with the C-shape ADF, the thick documents are only scanned manually sheet by sheet.

Therefore, it is necessary to provide an automatic document feeder which has a function of feeding documents continuously and a function of feeding thick documents automatically.

SUMMARY OF THE INVENTION

An object of the present invention is to provide an automatic document feeder which has a function of feeding documents continuously and a function of feeding thick documents automatically. The automatic document feeder includes a horizontal feeding path, a curve feeding path, a scanning unit, a motor, a movable document guider, an actuator, a feeding roller and a transmission structure. The horizontal feeding path has a front end opening positioned at one end of the horizontal feeding path, and an rear end opening positioned at the other end of the horizontal feeding path. One end of the curve feeding path is connected with a common document inlet, the other end of the curve feeding path is connected with a middle of the horizontal feeding path. A gentle bending corner is formed at a junction area between the curve feeding path and the horizontal feeding path. The scanning unit is arranged in the horizontal feeding path. The scanning unit is positioned between the gentle bending corner and the rear end opening. The motor outputs a forward torque or a converse torque according to a control. The movable document guider is rotatably positioned near the gentle bending corner for guiding documents from the curve feeding path to the horizontal feeding path. The actuator is rotatably positioned near the gentle bending corner for pushing against the movable document guider. The feeding roller is arranged in the horizontal feeding path for feeding the documents through the scanning unit. The transmission structure is connected among the motor, the feeding roller and the actuator for transmitting the forward torque or the converse torque. When the motor outputs the converse torque, the actuator pushes against the movable document guider to rotate towards an inner side of the gentle bending corner to leave the horizontal feeding path.

Another object of the present invention is to provide an automatic document feeder. The automatic document feeder includes a horizontal feeding path, a curve feeding path, a scanning unit, a motor, a movable document guider, an actuator, a feeding roller and a transmission structure. The horizontal feeding path has a front end opening positioned at one end of the horizontal feeding path, and an rear end opening positioned at the other end of the horizontal feeding path. A top end of the curve feeding path slantwise extends downward and frontward from top to bottom, and the top end of the curve feeding path is connected with a common document inlet. A bottom end of the curve feeding path is arched downward and frontward. The bottom end of the curve feeding path is connected with a middle of the horizontal feeding path. A gentle bending corner is formed at a junction area between the curve feeding path and the horizontal feeding path. The scanning unit is arranged in the horizontal feeding path. The scanning unit is positioned between the gentle bending corner and the rear end opening. The movable document guider is rotatably positioned near the gentle bending corner for guiding documents from the curve feeding path to the horizontal feeding path. The documents are fed from the common document inlet. The actuator is rotatably positioned near the gentle bending corner for pushing against the movable document guider. The feeding roller is arranged in the horizontal feeding path for feeding the documents through the scanning unit. The transmission structure is connected between the feeding roller and the actuator. The motor is connected with the transmission structure for outputting a forward torque or a converse torque. When the motor outputs the forward torque, the feeding roller accepts the forward torque via the transmission structure to feed the documents through the scanning unit and to eject the documents from the rear end opening. When the motor outputs the forward torque, the feeding roller accepts the forward torque via the transmission structure to feed a thick document through the scanning unit, the thick document is fed from the front end opening. When the motor outputs the converse torque, the actuator accepts the converse torque via the transmission structure to push against the movable document guider, so the movable document guider is rotated towards an inner side of the gentle bending corner to leave the horizontal feeding path.

Another object of the present invention is to provide an automatic document feeder. The automatic document feeder includes a horizontal feeding path, a curve feeding path, a scanning unit, a motor, a movable document guider, an actuator, a feeding roller and a transmission structure. The horizontal feeding path has a front end opening positioned at one end of the horizontal feeding path, and an rear end opening positioned at the other end of the horizontal feeding path. One end of the curve feeding path is connected with a common document inlet, the other end of the curve feeding path is connected with a middle of the horizontal feeding path. A gentle bending corner is formed at a junction area between the curve feeding path and the horizontal feeding path. The scanning unit is arranged in the horizontal feeding path. The scanning unit is positioned between the gentle bending corner and the rear end opening. The motor outputs a forward torque or a converse torque. The movable document guider is rotatably positioned near the gentle bending corner for guiding documents from the curve feeding path to the horizontal feeding path. The actuator is rotatably positioned near the gentle bending corner for pushing against the movable document guider. The feeding roller is arranged in the horizontal feeding path for feeding the documents through the scanning unit. The transmission structure is connected among the motor, the feeding roller and the actuator for transmitting the torque. When the motor outputs the forward torque, the feeding roller is driven by the transmission structure to transmit the documents to move towards the rear end opening from the common document inlet or the front end opening, when the motor outputs the converse torque, the feeding roller is driven by the transmission structure to transmit the documents to move towards the common document inlet or the front end opening from the rear end opening.

As described above, the automatic document feeder includes the curve feeding path and the horizontal feeding path, the motor, the movable document guider, the actuator, the feeding roller and the transmission structure, so that the automatic document feeder has a function of feeding the documents continuously and a function of feeding the thick documents automatically.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
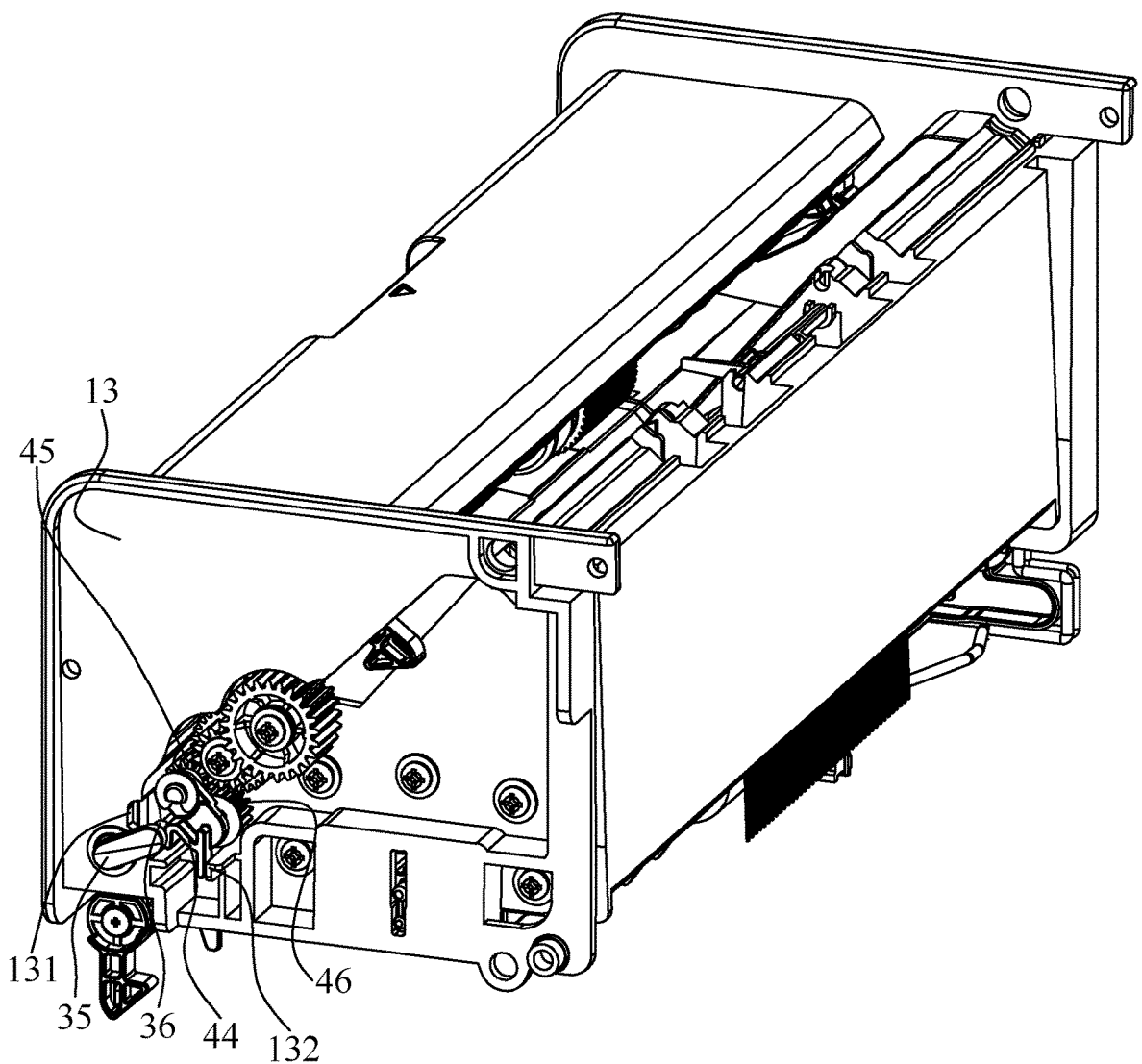
FIG. 1 is a perspective view of an automatic document feeder in accordance with a preferred embodiment of the present invention.
Figure 2:
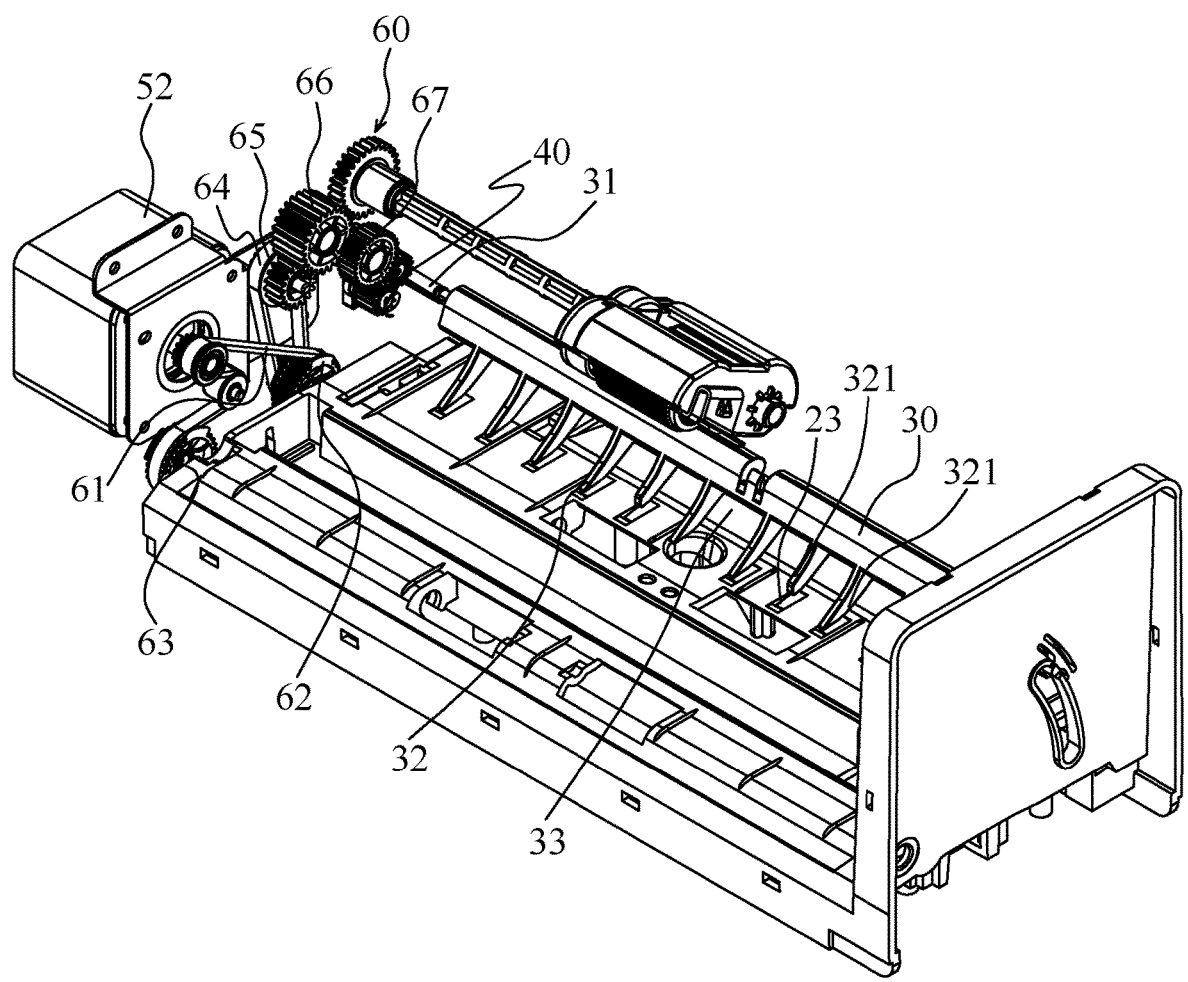
FIG. 2 is another perspective view of the automatic document feeder in accordance with the preferred embodiment of the present invention.
Figure 3:
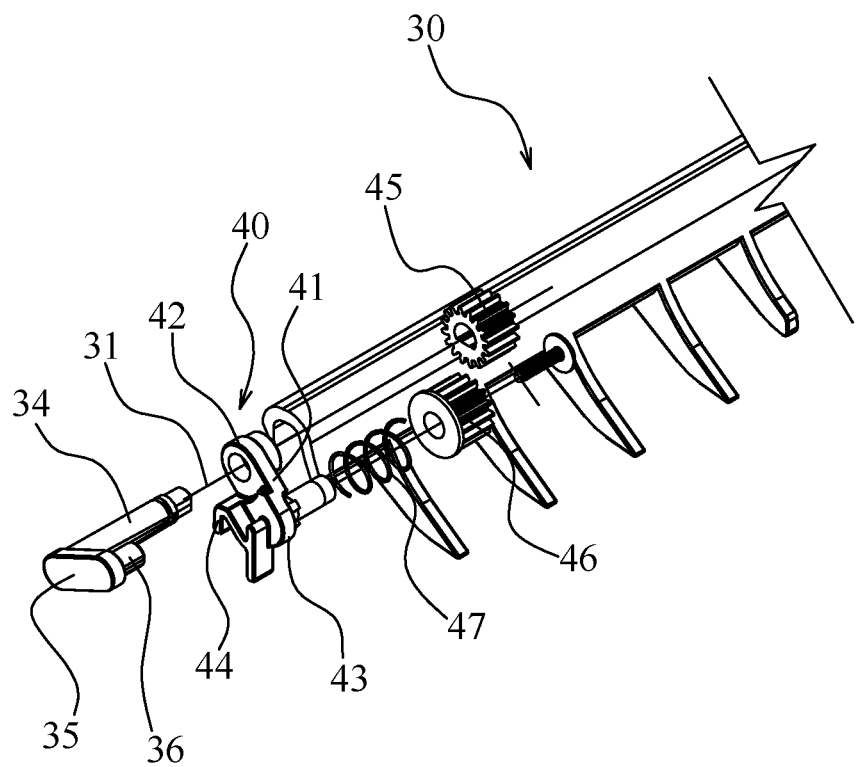
FIG. 3 is an exploded view of a movable document guider and an actuator of the automatic document feeder in accordance with the preferred embodiment of the present invention.
Figure 4:
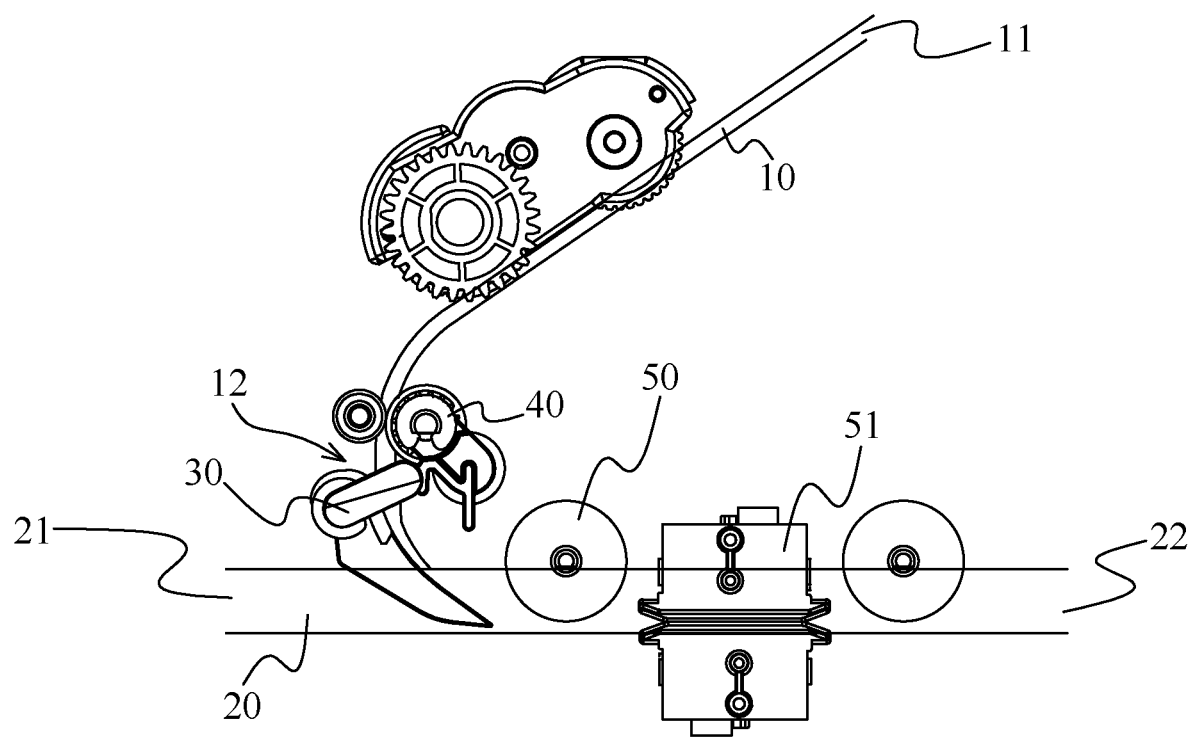
FIG. 4 is a diagrammatic drawing of the automatic document feeder in accordance with the preferred embodiment of the present invention.

Referring to FIG. 1 to FIG. 4, an automatic document feeder 100 in accordance with a preferred embodiment of the present invention is shown. The automatic document feeder 100 includes a curve feeding path 10 and a horizontal feeding path 20. The curve feeding path 10 is a substantially C shape. The horizontal feeding path 20 is a horizontal shape.

One end of the curve feeding path 10 slantwise extends downward and frontward from top to bottom, and the one end of the curve feeding path 10 is connected with a common document inlet 11. The other end of the curve feeding path 10 is arched downward and frontward. The other end of the curve feeding path 10 is connected with a middle of the horizontal feeding path 20, so that a gentle bending corner 12 is formed at a junction area between the curve feeding path 10 and the horizontal feeding path 20 for feeding documents from the curve feeding path 10 into the horizontal feeding path 20 more smoothly and conveniently. Specifically, a top end of the curve feeding path 10 slantwise extends downward and frontward from top to bottom, and the top end of the curve feeding path 10 is connected with the common document inlet 11, a bottom end of the curve feeding path 10 is arched downward and frontward, the bottom end of the curve feeding path 10 is connected with the middle of the horizontal feeding path 20. The horizontal feeding path 20 has a front end opening 21 positioned at one end of the horizontal feeding path 20, and an rear end opening 22 positioned at the other end of the horizontal feeding path 20. Specifically, the horizontal feeding path 20 has the front end opening 21 positioned at a front end of the horizontal feeding path 20, and the rear end opening 22 positioned at a rear end of the horizontal feeding path 20.

The automatic document feeder 100 further includes a lateral wall 13. The lateral wall 13 is arranged at one side of the horizontal feeding path 20 and one side of the curve feeding path 10. The automatic document feeder 100 further includes a scanning unit 51 arranged in the horizontal feeding path 20, a motor 52, a movable document guider 30, an actuator 40, a feeding roller 50 and a transmission structure 60. Preferable, the automatic document feeder 100 includes a plurality of the feeding rollers 50. The scanning unit 51 is positioned between the gentle bending corner 12 and the rear end opening 22 for capturing document images. The motor 52 outputs a forward torque or a converse torque according to a control. The movable document guider 30 is rotatably positioned near the gentle bending corner 12 for guiding the documents from the curve feeding path 10 to the horizontal feeding path 20. The documents are fed from the common document inlet 11.

In the preferred embodiment, the movable document guider 30 includes a rotary shaft 31, a guiding portion 32, a plurality of openings 33, an abutting portion 34, an extension arm 35 and a contacting rod 36. Preferably, the guiding portion 32 includes a plurality of guiding pieces 321. The rotary shaft 31 is rotatably connected to the lateral wall 13 of the automatic document feeder 100, and the rotary shaft 31 is positioned next to the gentle bending corner 12. The guiding portion 32 is extended towards the horizontal feeding path 20 from the rotary shaft 31 to guide the documents to the horizontal feeding path 20. The plurality of the guiding pieces 321 are extended towards the horizontal feeding path 20 from the rotary shaft 31. Each guiding piece 321 is a crescent shape from a side view. A lower surface of each guiding piece 321 is an arc shape. Several portions of an upper surface of a lower wall of the horizontal feeding path 20 are recessed downward to form a plurality of passageways 23. The plurality of the passageways 23 are located under the plurality of the guiding pieces 321. The plurality of the passageways 23 are corresponding to the plurality of the guiding pieces 321. The abutting portion 34 includes the extension arm 35 and the contacting rod 36. An outer end of the rotary shaft 31 extends outward and along an axial direction of the rotary shaft 31, and then extends along a radial direction of the rotary shaft 31 to form the abutting portion 34. The guiding portion 32 is arranged at an outer side of the gentle bending corner 12, and the guiding portion 32 further includes the plurality of the openings 33. The plurality of the guiding pieces 321 and the plurality of the openings 33 are disposed alternatively. Each opening 33 is formed between two adjacent guiding pieces 321. Each opening 33 is extended from a tail end of the guiding portion 32 to the rotary shaft 31.

In the preferred embodiment, an extreme end of the rotary shaft 31 extends outward and then extends along the radial direction of the rotary shaft 31 to form the extension arm 35. An inner surface of a tail end of the extension arm 35 protrudes inward to form the contacting rod 36. The contacting rod 36 is parallel to the rotary shaft 31. The extension arm 35 and the contacting rod 36 are positioned away from the curve feeding path 10 and the horizontal feeding path 20, so when the actuator 40 pushes the movable document guider 30, the documents are avoided from being fed. One side of an outer surface of the lateral wall 13 is recessed inward to form a stopping groove 131.

The actuator 40 is rotatably positioned near the gentle bending corner 12 for pushing against the movable document guider 30. The feeding roller 50 is arranged in the horizontal feeding path 20 for feeding the documents through the scanning unit 51. The transmission structure 60 is connected between the feeding roller 50 and the actuator 40. The motor 52 is connected with the transmission structure 60 for outputting the forward torque or the converse torque. The transmission structure 60 is connected among the motor 52, the feeding roller 50 and the actuator 40 for transmitting the torque which is the forward torque or the converse torque. When the motor 52 outputs the forward torque, the feeding roller 50 accepts the forward torque via the transmission structure 60 to feed the documents through the scanning unit 51 and to eject the documents from the rear end opening 22. When the motor 52 outputs the forward torque, the feeding roller 50 accepts the forward torque via the transmission structure 60 to feed a thick document through the scanning unit 51, the thick document is fed from the front end opening 21. When the motor 52 outputs the converse torque, the actuator 40 accepts the converse torque via the transmission structure 60 to push against the movable document guider 30, so the movable document guider 30 is rotated towards an inner side of the gentle bending corner 12 to leave the horizontal feeding path 20.

In this preferred embodiment, the transmission structure 60 includes a first belt 61 connected with the motor 52, a first feeding gear 62 connected with the first belt 61, and a second feeding gear 63 connected with the first belt 61. The motor 52 drives the first belt 61, the first feeding gear 62 and the second feeding gear 63. When the motor 52 outputs the forward torque, the feeding roller 50 is driven by the first belt 61, the first feeding gear 62 and the second feeding gear 63 of the transmission structure 60 to transmit the documents to move towards the rear end opening 22 from the common document inlet 11 or the front end opening 21. When the motor outputs the converse torque, the feeding roller 50 is driven by the first belt 61, the first feeding gear 62 and the second feeding gear 63 of the transmission structure 60 to transmit the documents to move towards the common document inlet 11 or the front end opening 21 from the rear end opening 22.

The first feeding gear 62 is a double layer gear. One side of the first feeding gear 62 is connected to a second belt 64. The second belt 64 is connected to a zero transmission gear 65. The zero transmission gear 65 is also the double layer gear which is connected to a first transmission gear 66. The first transmission gear 66 is connected to a second transmission gear 67. The second transmission gear 67 is also the double layer gear, and the second transmission gear 67 is connected to the actuator 40.

In this preferred embodiment, the actuator 40 includes a swing arm 41, a pushing portion 44, a driving gear 45, a torsion limiting gear 46 and a spring 47. The swing arm 41 has a pivot end 42 and a free end 43. The driving gear 45 is rotatably connected to the pivot end 42. The driving gear 45 and the pivot end 42 are coaxial. The driving gear 45 is engaged with the second transmission gear 67 of the transmission structure 60 for accepting the torque from the transmission structure 60. The torsion limiting gear 46 is rotatably connected to the free end 43. The torsion limiting gear 46 and the free end 43 are coaxial. The torsion limiting gear 46 is engaged with the driving gear 45. The spring 47 is arranged between the torsion limiting gear 46 and the swing arm 41 for exerting a positive force between the torsion limiting gear 46 and the swing arm 41. The pushing portion 44 is extended outward from an outer surface of the swing arm 41. The pushing portion 44 pushes the contacting rod 36. An outer surface of the lateral wall 13 protrudes outward to form a stopping block 132 located near the pushing portion 44. When the swing arm 41 is pushed, the extension arm 35 of the movable document guider 30 swings together with the swing arm 41, the extension arm 35 guides the movable document guider 30 to ascend or descend.

When the automatic document feeder 100 feeds the documents, specific actions of feeding the documents by the automatic document feeder 100 are described as follows.

Figure 5:
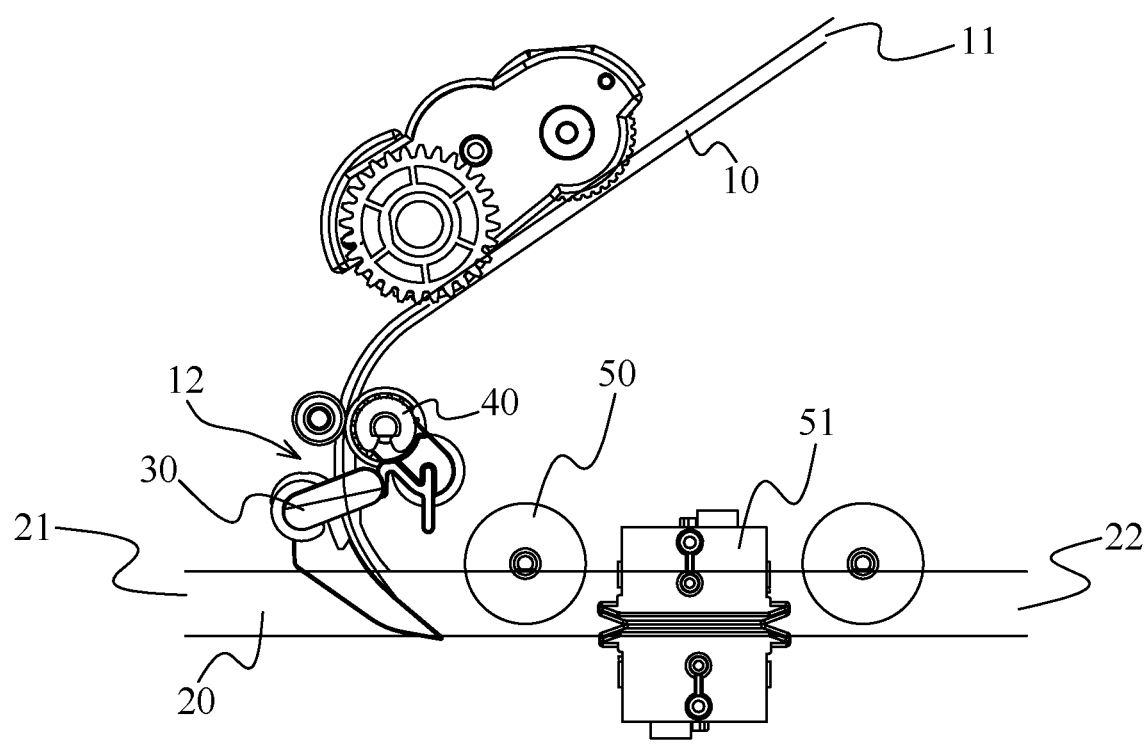
FIG. 5 is a diagrammatic drawing showing that a common document is fed into the automatic document feeder from a common document inlet of the automatic document feeder in accordance with the preferred embodiment of the present invention.
Figure 6:
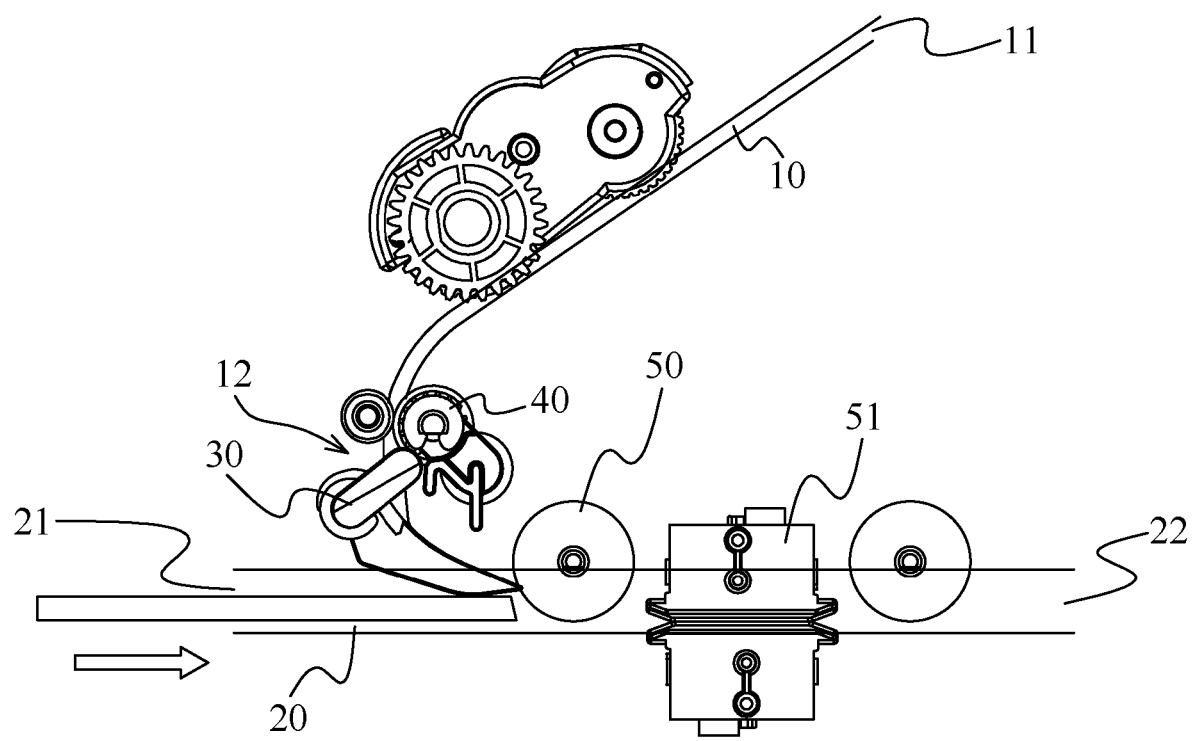
FIG. 6 is a diagrammatic drawing showing that a thick document is fed into the automatic document feeder from a front end opening of the automatic document feeder in accordance with the preferred embodiment of the present invention.

Referring to FIG. 1 and FIG. 5, when the automatic document feeder 100 feeds the documents from the common document inlet 11 to the scanning unit 51, the documents push the movable document guider 30 and the movable document guider 30 rotates clockwise, at the moment, the contacting rod 36 pushes the pushing portion 44 until the pushing portion 44 contacts with the stopping block 132. The pushing portion 44 further pushes against the stopping block 132, and the pushing portion 44 is stopped by the stopping block 132. When the movable document guider 30 is blocked by the stopping block 132, the movable document guider 30 is unable to rotate towards the outer side of the gentle bending corner 12, and then the documents are pushed towards the scanning unit 51.

Referring to FIG. 1 to FIG. 6, when a thick document is fed into the horizontal feeding path 20 from the front end opening 21, the thick document pushes the movable document guider 30 directly, so the movable document guider 30 is pushed to rotate counter-clockwise, and then the thick document enters the horizontal feeding path 20. The movable document guider 30 is pushed to rotate counter-clockwise until the contacting rod 36 contacts with a wall of the stopping groove 131, the movable document guider 30 is stopped by the contacting rod 36 and the stopping groove 131, and then the movable document guider 30 is still pushed by the thick document. So the movable document guider 30 is avoided from rotating towards the inner side of the gentle bending corner 12 overly. The plurality of the feeding rollers 50 rotate to feed the thick document to the scanning unit 51. The thick document is scanned.

Figure 7:
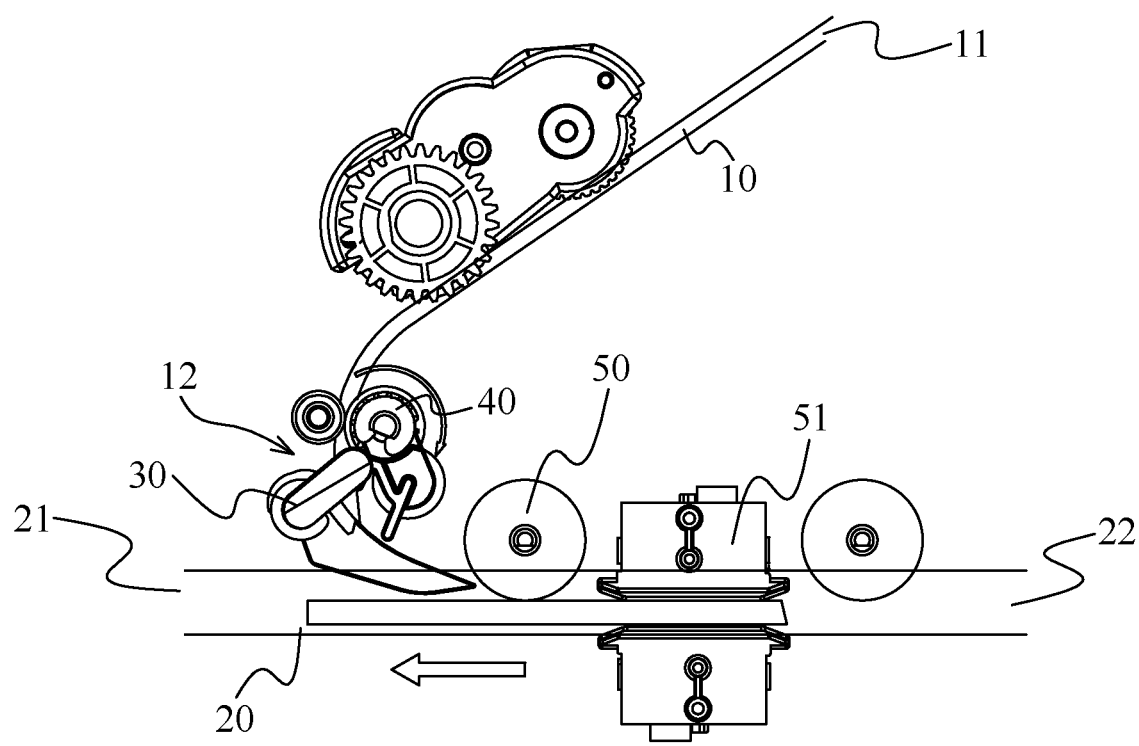
FIG. 7 is a diagrammatic drawing showing that the thick document is ejected to the front end opening of the automatic document feeder in accordance with the preferred embodiment of the present invention.
Figure 8:
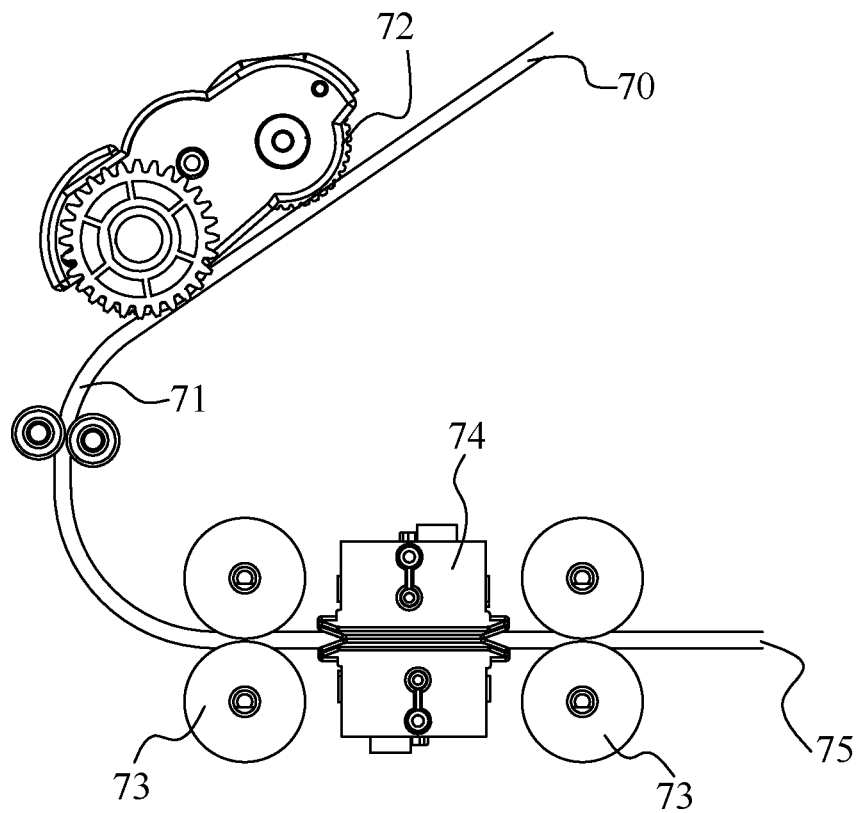
FIG. 8 is a diagrammatic drawing of an automatic document feeder in prior art.

Referring to FIG. 7, after the thick document is scanned, the automatic document feeder 100 feeds the thick document backward, the plurality of the feeding rollers 50 rotate, and the thick document is seceded from the front end opening 21 along an original direction. At the moment, the motor 52 outputs the converse torque, and the transmission structure 60 transmits the converse torque to the driving gear 45 for driving the torsion limiting gear 46 to rotate. The normal force which is exerted between the torsion limiting gear 46 and the swing arm 41 by the spring 47 generates a friction force that blocks a relative rotation between the torsion limiting gear 46 and the swing arm 41. Therefore, the swing arm 41 is driven by the converse torque to swing clockwise, the swing arm 41 drives the extension arm 35 to rotate counter-clockwise, the movable document guider 30 is pushed to rotate towards the inner side of the gentle bending corner 12 and the movable document guider 30 exits from the horizontal feeding path 20, the movable document guider 30 ascends, and then the thick document moves backward through the horizontal feeding path 20, and the thick document is ejected from the front end opening 21 smoothly.

When the guiding portion 32 rotates counter-clockwise to leave the horizontal feeding path 20, the contacting rod 36 contacts with the wall of the stopping groove 131 to avoid the movable document guider 30 overly rotating towards the inner side of the gentle bending corner 12. The torque which is required by the movable document guider 30 for continuing rotating the movable document guider 30 is greater than the friction force provided by the spring 47, so the torsion limiting gear 46 and the swing arm 41 idle to avoid damaging the motor 52.

As described above, the automatic document feeder 100 includes the curve feeding path 10 and the horizontal feeding path 20, the motor 52, the movable document guider 30, the actuator 40, the feeding roller 50 and the transmission structure 60, so that the automatic document feeder 100 has a function of feeding the documents continuously and a function of feeding the thick documents automatically.

What is claimed is:

1. An automatic document feeder, comprising:
  a horizontal feeding path having a front end opening positioned at one end of the horizontal feeding path, and an rear end opening positioned at the other end of the horizontal feeding path;
  a curve feeding path, one end of the curve feeding path being connected with a common document inlet, the other end of the curve feeding path being connected with a middle of the horizontal feeding path, a gentle bending corner being formed at a junction area between the curve feeding path and the horizontal feeding path;
  a scanning unit arranged in the horizontal feeding path, the scanning unit being positioned between the gentle bending corner and the rear end opening;
  a motor outputting a forward torque or a converse torque according to a control;
  a movable document guider rotatably positioned near the gentle bending corner for guiding documents from the curve feeding path to the horizontal feeding path;
  an actuator rotatably positioned near the gentle bending corner for pushing against the movable document guider;
  a feeding roller arranged in the horizontal feeding path for feeding the documents through the scanning unit;
  a transmission structure connected among the motor, the feeding roller and the actuator for transmitting the forward torque or the converse torque,
  wherein when the motor outputs the converse torque, the actuator pushes against the movable document guider to rotate towards an inner side of the gentle bending corner to leave the horizontal feeding path.

2. The automatic document feeder as claimed in claim 1, wherein the actuator includes a swing arm, a driving gear, a torsion limiting gear and a spring, the swing arm has a pivot end and a free end, the driving gear is rotatably connected to the pivot end, the driving gear is engaged with the transmission structure for accepting a torque, the torsion limiting gear is rotatably connected to the free end, the torsion limiting gear is engaged with the driving gear, the spring is arranged between the torsion limiting gear and the swing arm for exerting a positive force between the torsion limiting gear and the swing arm.

3. The automatic document feeder as claimed in claim 1, wherein the movable document guider includes a rotary shaft, a guiding portion and an abutting portion, the rotary shaft is rotatably connected to a lateral wall of the automatic document feeder, and the rotary shaft is positioned next to the gentle bending corner, the guiding portion is extended towards the horizontal feeding path from the rotary shaft to guide the documents to the horizontal feeding path, the abutting portion is extended outward from an outer end of the rotary shaft along a radial direction of the rotary shaft.

4. The automatic document feeder as claimed in claim 3, wherein the guiding portion includes a plurality of guiding pieces, the plurality of the guiding pieces are extended towards the horizontal feeding path from the rotary shaft, each guiding piece is a crescent shape, a lower surface of each guiding piece is an arc shape, several portions of an upper surface of a lower wall of the horizontal feeding path are recessed downward to form a plurality of passageways, the plurality of the passageways are located under the plurality of the guiding pieces, the plurality of the passageways are corresponding to the plurality of the guiding pieces.

5. The automatic document feeder as claimed in claim 4, wherein the guiding portion further includes a plurality of openings, the plurality of the guiding pieces and the plurality of the openings are disposed alternatively, each opening is formed between two adjacent guiding pieces.

6. The automatic document feeder as claimed in claim 3, wherein an outer end of the rotary shaft extends outward and along an axial direction of the rotary shaft, and then extends along a radial direction of the rotary shaft to form the abutting portion, the abutting portion includes an extension arm and a contacting rod, an extreme end of the rotary shaft extends outward and then extends along the radial direction of the rotary shaft to form the extension arm, an inner surface of a tail end of the extension arm protrudes inward to form the contacting rod, the contacting rod is parallel to the rotary shaft, the actuator further includes a swing arm and a pushing portion, the pushing portion is extended outward from an outer surface of the swing arm, the pushing portion pushes the contacting rod.

7. An automatic document feeder, comprising:
a horizontal feeding path having a front end opening positioned at one end of the horizontal feeding path, and an rear end opening positioned at the other end of the horizontal feeding path;
a curve feeding path, a top end of the curve feeding path slantwise extending downward and frontward from top to bottom, and the top end of the curve feeding path being connected with a common document inlet, a bottom end of the curve feeding path being arched downward and frontward, the bottom end of the curve feeding path being connected with a middle of the horizontal feeding path, a gentle bending corner being formed at a junction area between the curve feeding path and the horizontal feeding path;
a scanning unit arranged in the horizontal feeding path, the scanning unit being positioned between the gentle bending corner and the rear end opening;
a movable document guider rotatably positioned near the gentle bending corner for guiding documents from the curve feeding path to the horizontal feeding path, the documents being fed from the common document inlet;
an actuator rotatably positioned near the gentle bending corner for pushing against the movable document guider;
a feeding roller arranged in the horizontal feeding path for feeding the documents through the scanning unit;
a transmission structure connected between the feeding roller and the actuator; and
a motor connected with the transmission structure for outputting a forward torque or a converse torque,
wherein when the motor outputs the forward torque, the feeding roller accepts the forward torque via the transmission structure to feed the documents through the scanning unit and to eject the documents from the rear end opening;
wherein when the motor outputs the forward torque, the feeding roller accepts the forward torque via the transmission structure to feed a thick document through the scanning unit, the thick document is fed from the front end opening;
wherein when the motor outputs the converse torque, the actuator accepts the converse torque via the transmission structure to push against the movable document guider, so the movable document guider is rotated towards an inner side of the gentle bending corner to leave the horizontal feeding path.

8. An automatic document feeder, comprising:
a horizontal feeding path having a front end opening positioned at one end of the horizontal feeding path, and an rear end opening positioned at the other end of the horizontal feeding path;
a curve feeding path, one end of the curve feeding path being connected with a common document inlet, the other end of the curve feeding path being connected with a middle of the horizontal feeding path, a gentle bending corner being formed at a junction area between the curve feeding path and the horizontal feeding path;
a scanning unit arranged in the horizontal feeding path, the scanning unit being positioned between the gentle bending corner and the rear end opening;
a motor outputting a forward torque or a converse torque;
a movable document guider rotatably positioned near the gentle bending corner for guiding documents from the curve feeding path to the horizontal feeding path;
an actuator rotatably positioned near the gentle bending corner for pushing against the movable document guider;
a feeding roller arranged in the horizontal feeding path for feeding the documents through the scanning unit; and
a transmission structure connected among the motor, the feeding roller, and the actuator for transmitting the torque,
wherein when the motor outputs the forward torque, the feeding roller is driven by the transmission structure to transmit the documents to move towards the rear end opening from the common document inlet or the front end opening, when the motor outputs the converse torque, the feeding roller is driven by the transmission structure to transmit the documents to move towards the common document inlet or the front end opening from the rear end opening.

* * * * *